US010156692B2

(12) United States Patent
Morris et al.

(10) Patent No.: US 10,156,692 B2
(45) Date of Patent: Dec. 18, 2018

(54) OPTICAL FIBER FURCATION TRANSITION ASSEMBLY WITH INTEGRATED RETENTION FEATURE

(71) Applicant: AFL TELECOMMUNICATIONS LLC, Duncan, SC (US)

(72) Inventors: Edward Morris, Greer, SC (US); Roger Vaughn, Greer, SC (US); Vahid Ebrahimi, Simpsonville, SC (US); Daigo Saito, Port Coquitlam (CA); Wilfred Courchaine, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/319,562

(22) PCT Filed: Jun. 17, 2015

(86) PCT No.: PCT/US2015/036275
§ 371 (c)(1),
(2) Date: Dec. 16, 2016

(87) PCT Pub. No.: WO2015/195829
PCT Pub. Date: Dec. 23, 2015

(65) Prior Publication Data
US 2017/0322386 A1  Nov. 9, 2017

Related U.S. Application Data

(60) Provisional application No. 62/013,251, filed on Jun. 17, 2014.

(51) Int. Cl.
*G02B 6/44* (2006.01)

(52) U.S. Cl.
CPC ......... *G02B 6/4471* (2013.01); *G02B 6/4444* (2013.01)

(58) Field of Classification Search
None
See application file for complete search history.

(56) References Cited

U.S. PATENT DOCUMENTS 4,045,121 A * 8/1977 Clark ................... G02B 6/3805
385/58
4,826,277 A * 5/1989 Weber .................. G02B 6/3878
385/100

(Continued)

FOREIGN PATENT DOCUMENTS

WO  WO 2012/104148 A1  8/2012
WO  WO 2013/177016 A1  11/2013

OTHER PUBLICATIONS

AFL Telecommunications LLC; International Patent Application No. PCT/US2015/036275; International Search Report; dated Sep. 15, 2015; (2 pages).

*Primary Examiner* — Michelle R Connelly
(74) *Attorney, Agent, or Firm* — Dority & Manning, P.A.

(57) ABSTRACT

An optical fiber transition assembly comprises a cable having a first terminal end from which extends an optical fiber. A furcation tube is also provided, having a second terminal end near the first terminal end of the cable into which the optical fiber of the cable is received. A polymeric transition element surrounds the first and second terminal ends to protect and secure the optical fiber in transition from the cable to the furcation tube, the polymeric transition element being configured to be retained in an entry port of an enclosure.

25 Claims, 10 Drawing Sheets

(56) References Cited

U.S. PATENT DOCUMENTS

| | | | | |
|---|---|---|---|---|
| 5,109,452 | A * | 4/1992 | Selvin | G02B 6/3817 385/56 |
| 5,185,840 | A * | 2/1993 | Iapicco | G02B 6/3865 385/100 |
| 5,199,095 | A * | 3/1993 | Iapicco | G02B 6/3865 385/100 |
| 5,280,556 | A * | 1/1994 | Jones | G02B 6/4444 385/135 |
| 5,516,985 | A * | 5/1996 | Merkel | H02G 15/043 174/138 F |
| 5,783,778 | A * | 7/1998 | Foss | H02G 15/013 174/77 R |
| 5,886,300 | A * | 3/1999 | Strickler | G02B 6/4444 174/135 |
| 6,240,229 | B1 | 5/2001 | Roth | |
| 6,274,812 | B1 * | 8/2001 | Daoud | H02G 3/088 16/2.2 |
| 6,462,275 | B1 * | 10/2002 | Daoud | H02G 3/088 16/2.1 |
| 6,571,048 | B1 * | 5/2003 | Bechamps | G02B 6/4471 385/136 |
| 6,985,665 | B2 * | 1/2006 | Baechtle | G02B 6/4472 385/134 |
| 7,494,284 | B2 * | 2/2009 | Robinson | G02B 6/4471 385/106 |
| 8,404,975 | B2 * | 3/2013 | Chang | H01R 43/28 174/102 R |
| 8,662,760 | B2 | 3/2014 | Cline et al. | |
| 8,737,786 | B1 * | 5/2014 | Compton | G02B 6/4472 385/100 |
| 8,822,845 | B2 * | 9/2014 | Lamprecht et al. | 174/650 |
| 9,235,021 | B2 * | 1/2016 | Islam | G02B 6/4471 |
| 9,297,974 | B2 * | 3/2016 | Valderrabano Berrones et al. | G02B 6/4429 |
| 9,405,068 | B2 * | 8/2016 | Graham et al. | G02B 6/241 |
| 9,529,173 | B2 * | 12/2016 | Courchaine et al. | G02B 6/4472 |
| 9,696,512 | B2 * | 7/2017 | Miller | G02B 6/4459 |
| 2008/0131067 | A1 * | 6/2008 | Ugolini et al. | G02B 6/00 385/135 |
| 2008/0138026 | A1 * | 6/2008 | Yow et al. | G02B 6/00 |
| 2010/0054676 | A1 * | 3/2010 | Cooke et al. | 385/100 |
| 2010/0220964 | A1 * | 9/2010 | de Jong et al. | G02B 6/44 385/100 |
| 2011/0182558 | A1 * | 7/2011 | Garcia et al. | G02B 6/44 385/135 |
| 2012/0301090 | A1 * | 11/2012 | Cline et al. | G02B 6/44 385/103 |
| 2013/0330052 | A1 * | 12/2013 | Thackston et al. | G02B 6/04 385/137 |
| 2014/0140671 | A1 * | 5/2014 | Islam | G02B 6/4471 385/101 |
| 2015/0301300 | A1 * | 10/2015 | Fisher et al. | G02B 6/4477 385/135 |
| 2017/0068065 | A1 * | 3/2017 | Thompson et al. | G02B 6/4471 385/135 |

* cited by examiner

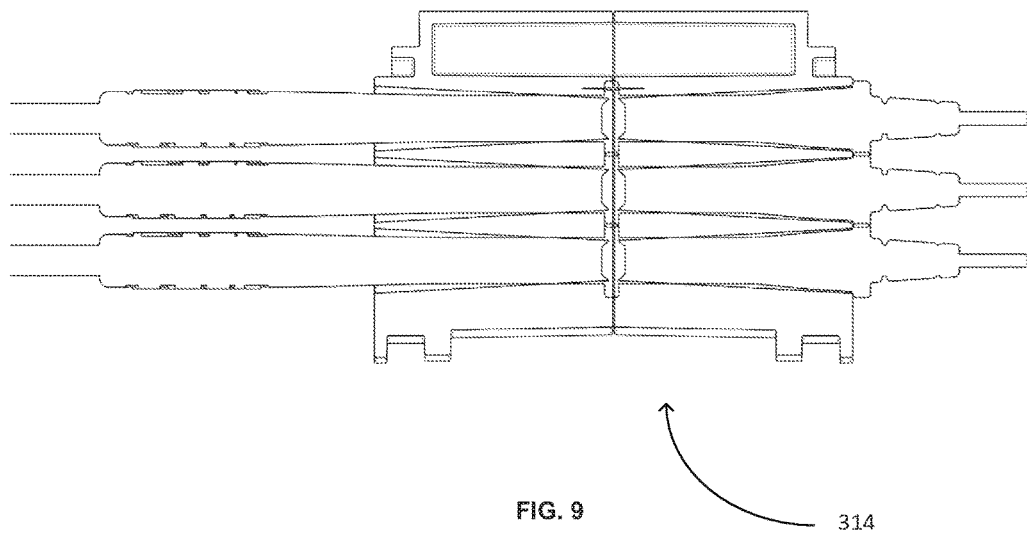
FIG. 9        314
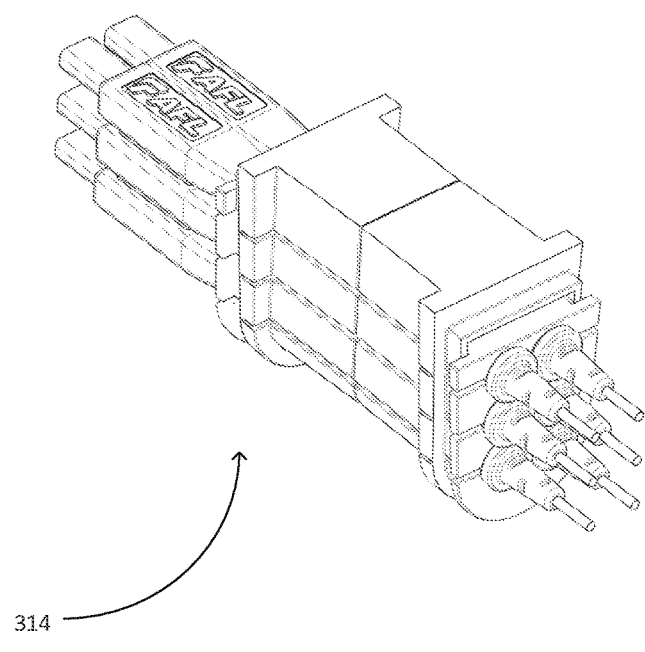
314
FIG. 10

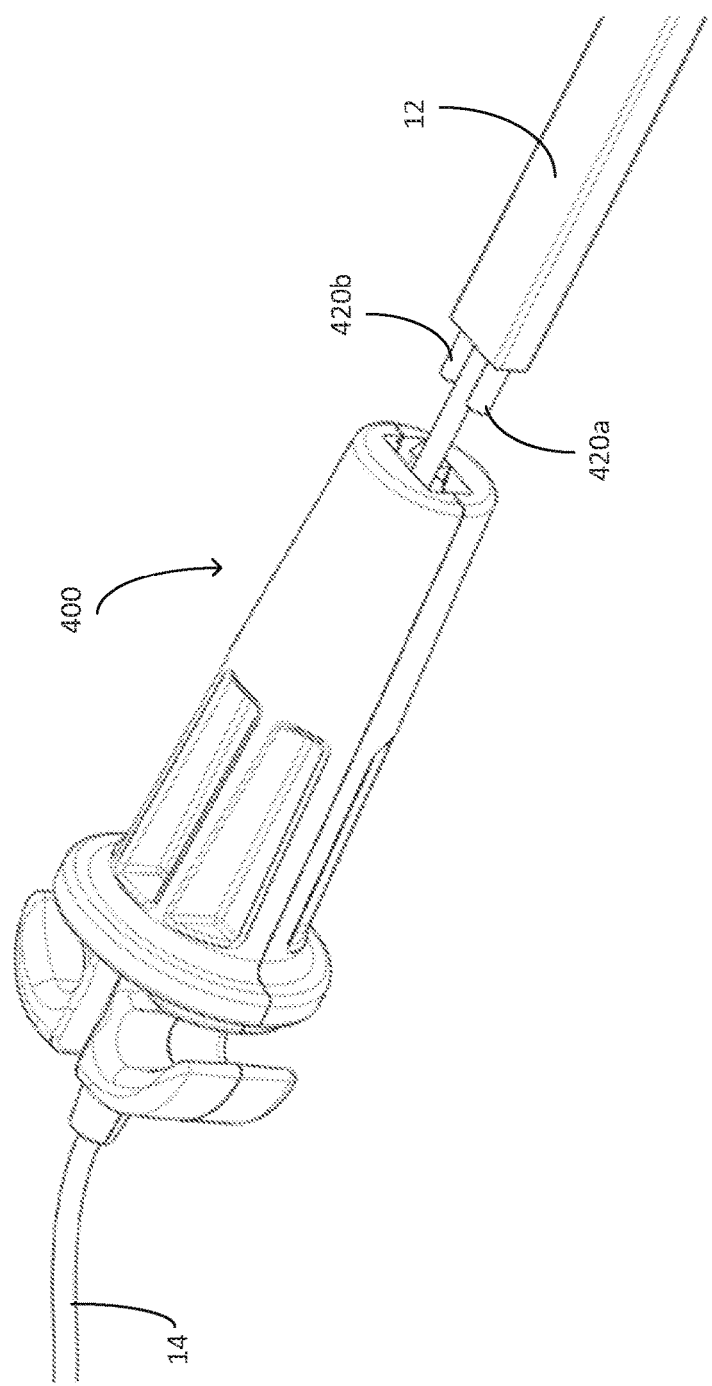

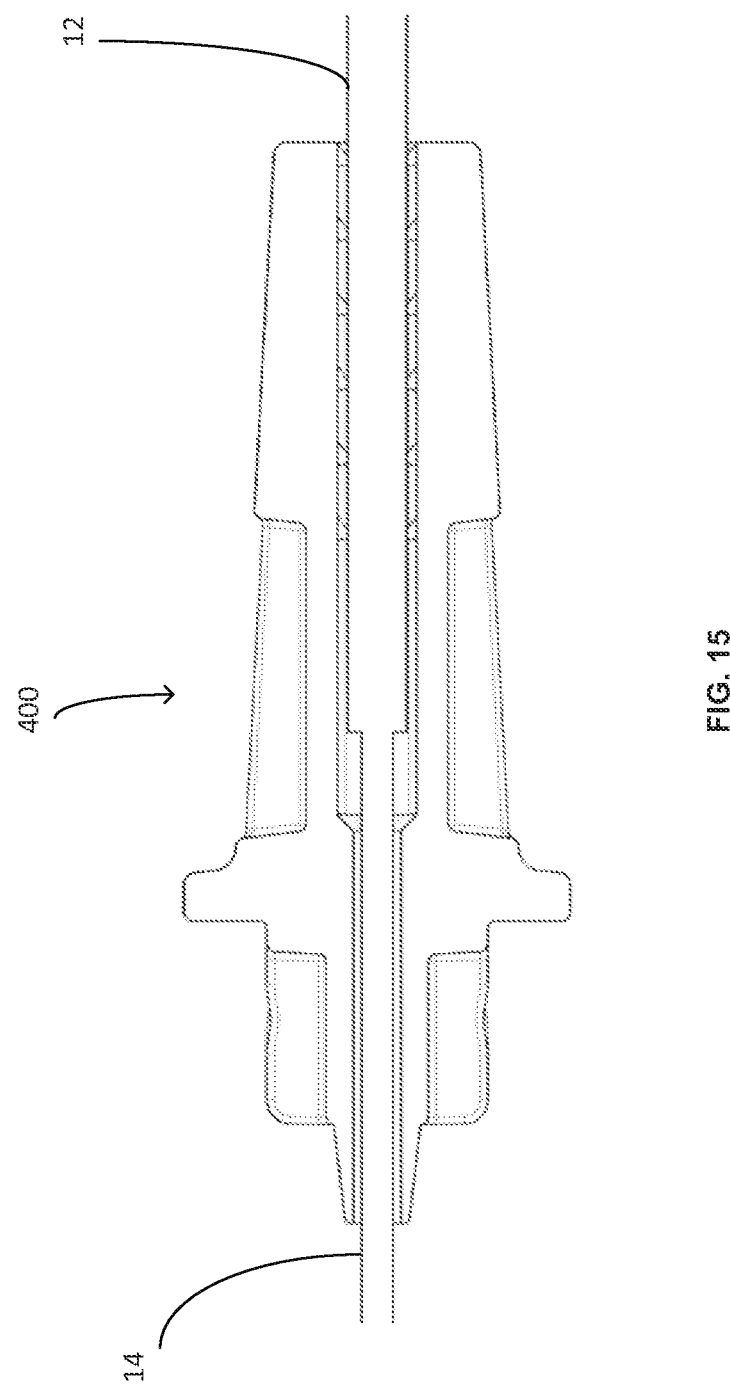

OPTICAL FIBER FURCATION TRANSITION ASSEMBLY WITH INTEGRATED RETENTION FEATURE

This application is based upon and claims the benefit of priority from U.S. Provisional Application No. 62/013,251, filed Jun. 17, 2014 in the United States Patent and Trademark Office, and as a U.S. national stage filing of International Application No. PCT/US2015/036275 having an international filing date of Jun. 17, 2015, the disclosures of both of which are incorporated by reference herein in their entireties.

BACKGROUND OF THE INVENTION

The present invention relates to the art of optical fibers. More particularly, the present invention relates to a furcation transition assembly which has an integrated retention feature.

The ability of high-quality optical fiber to transmit large amounts of information without appreciable signal degradation is well known. As a result, optical fibers have found widespread use in many applications, such as voice and data transmission. Optical fiber is typically supplied and installed as fiber optic cable. The term "fiber optic cable" refers to the combination of the actual optical fiber plus the structure in which it is carried and protected during and after installation. Generally, a fiber optic cable includes the optical fiber, aramid fibers or other strength members, and an outer sheath. One common type of fiber optic cable used as outside plant drop cable is "flat type cable." Because flat type cable typically has two strength members of aramid fiber reinforced polymer (FRP) located on lateral sides of the optical fiber, it exhibits sufficient stiffness for use as a drop cable.

In order to be connected for use, the optical fiber inside the cable must be suitably terminated. Toward this end, the optical fiber is typically furcated from the cable into a smaller protective tube. In outside plant (OSP) applications, the cost of connectivity is relatively high in comparison with FTTH (fiber to the home) applications. In this regard, hardware and methods of installation tend to be specialized and proprietary in OSP applications, which increases costs. Custom products require specific custom assemblies, connectors, and closures.

The present invention recognizes the foregoing considerations, and others, of the prior art.

SUMMARY OF THE INVENTION

In accordance with one aspect, the present invention provides an optical fiber transition assembly comprising a cable having a first terminal end from which extends an optical fiber. A furcation tube is also provided, having a second terminal end near the first terminal end of the cable into which the optical fiber of the cable is received. A polymeric transition element surrounds the first and second terminal ends to protect and secure the optical fiber in transition from the cable to the furcation tube, the polymeric transition element being configured to be retained in an entry port of an enclosure.

Preferably, the polymeric transition element comprises a molded element having a cable portion, a furcation portion, and a retention portion. In some cases, the furcation portion interposes the cable portion and the retention portion. In other cases, the retention portion interposes the cable portion and the furcation portion. For example, at least part of the retention portion may have an outer configuration substantially similar in its dimensions to that of the cable. In such embodiments, the retention portion may comprise first and second spaced apart shoulders for engaging an entry port grommet.

In some embodiments, the cable portion of the transition element may define a plurality of transverse grooves on its outer surface to facilitate flexibility. Exemplary embodiments are contemplated in which the transition element comprises multiple sections attached together. Moreover, the transition element may comprise an elongated opening in which the cable is slidably received. Gripping teeth may be formed in the elongated opening to facilitate retention of the cable.

Preferably, the transition element may comprise at least two flexible arms for snapping into the entry port. Alternatively, the transition element may comprise a circular groove for sliding into the entry port.

Other aspects of the present invention provide an optical fiber assembly comprising an optical fiber cable having a first terminal end from which extends an optical fiber. An enclosure defines an entry port through which the optical fiber passes into an interior thereof. The assembly includes a transition element surrounding the first terminal end of the optical fiber cable to protect and secure the optical fiber in transition from the cable to the interior of the enclosure, the transition element configured to be retained at the entry port such that the transition element is maintained in position.

According to another aspect, the present invention provides a transition element for transition of an optical fiber from an optical fiber cable to a furcation tube. The transition element comprises a plurality of transition sections attached together. Each of the transition sections has an axis along which extends a first wider groove and a second narrower groove which respectively form a larger opening at a first end of the transition element and a smaller opening at a second end of the transition element. The larger opening is configured for receipt of the optical fiber cable and the smaller opening is configured for receipt of the furcation tube.

Another aspect of the present invention relates to a method of providing a transition of an optical fiber from an optical fiber cable to a furcation tube. One step of the method involves providing a transition element having an axis along which extends a larger opening from a first end of the transition element and a smaller opening from a second end of the transition element. A furcation tube is inserted into the smaller opening. According to another step, a selected portion of an outer sheath of the optical fiber cable is removed to expose the optical fiber. The optical fiber is fed through the larger opening and into the furcation tube. A portion of remaining outer sheath of the optical fiber cable is pushed into the larger opening.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 9 is a diagrammatic representation showing a plurality of transitions in accordance with the embodiment of FIG. 8 installed in entry port grommets.

FIG. 10 is a perspective view of a plurality of transitions in accordance with the embodiment of FIG. 8 installed in entry port grommets.

FIG. 13 shows the manner in which a cable may be inserted into the transition of FIGS. 12A-B.

FIG. 15 is a diagrammatic cross-sectional view taken along line 15-15 of FIG. 14.

Figure 1:
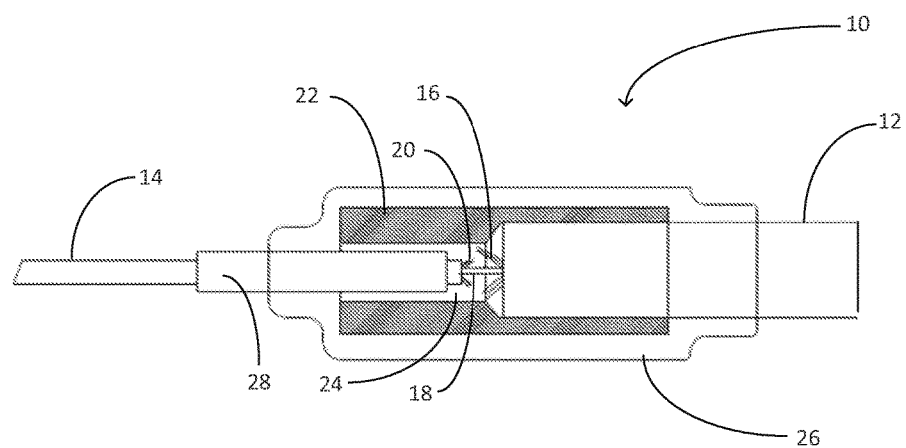
FIG. 1 is a diagrammatic representation showing a typical cable to furcation transition of the prior art.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Before discussing embodiments of the present invention, it is helpful to describe certain aspects of the prior art in more detail. In this regard, FIG. 1 shows a prior art transition 10 from an OSP drop cable 12 to a furcation 14. As one skilled in the art will recognize, cable 12 encloses one or more optical fibers inside of an outer jacket. Aramid fibers (shown at 16) and other strengthening elements may be located along with optical fiber 18 inside the outer jacket. Furcation 14 is a smaller protective tube for a single optical fiber that is more flexible than cable 12. As shown at 20, furcation 14 may also have aramid fibers.

Transition 10 protects the fragile optical fiber 18 from breaking as it goes from cable 12 to furcation 14. In this case, a complicated transition structure is provided having a machined transition piece 22 defining a cavity at which optical fiber 18 passes from cable 12 to furcation 14. After the pieces are fit together, the cavity is filled with epoxy 24 which, once cured, locks everything in place. Typically, the epoxy may take several minutes to cure, resulting in a long manufacturing time for transition 10. The machined transition piece is then enclosed by a heat shrink covering 26. A short piece of stiff tubing 28 surrounds the terminal portion of furcation 14 to give it additional rigidity at this location.

Figure 2:
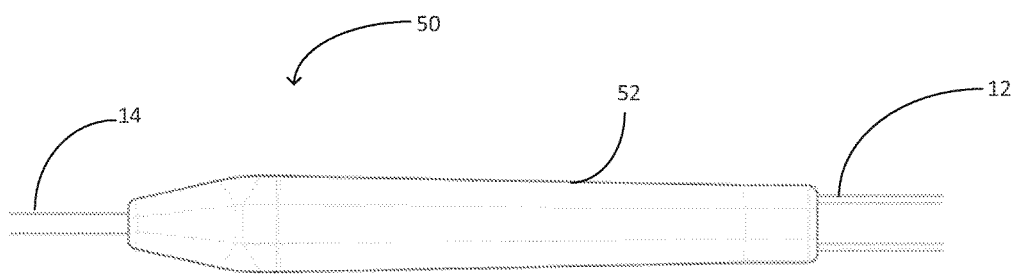
FIG. 2 is an elevational view of an overmold transition.

FIG. 2 illustrates an overmold transition 50. In this case, the terminal ends of cable 12 and furcation 14, along with the short length of optical fiber between them, is surrounded by a polymeric overmold 52 which locks all of the components in place. The overmold (which may be formed from polyamide) has sufficient thickness and rigidity to protect the fragile optical fiber from damage.

Figure 3:
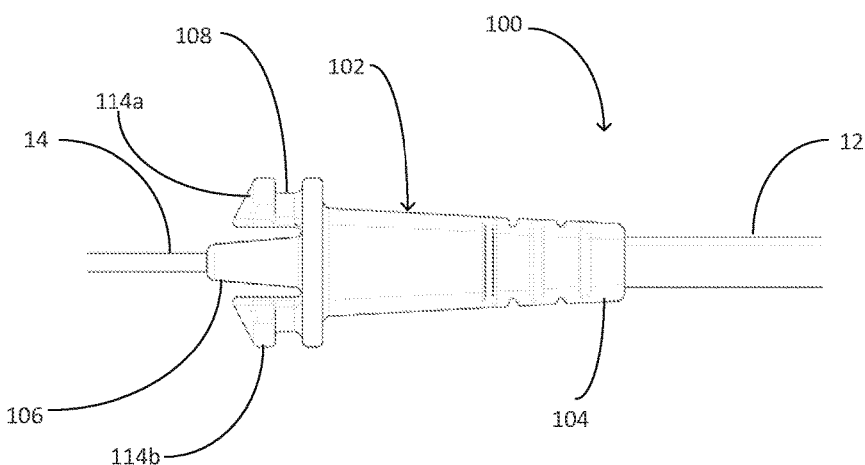
FIG. 3 is an elevational view of a cable to furcation transition in accordance with a first embodiment of the present invention.
Figure 4:
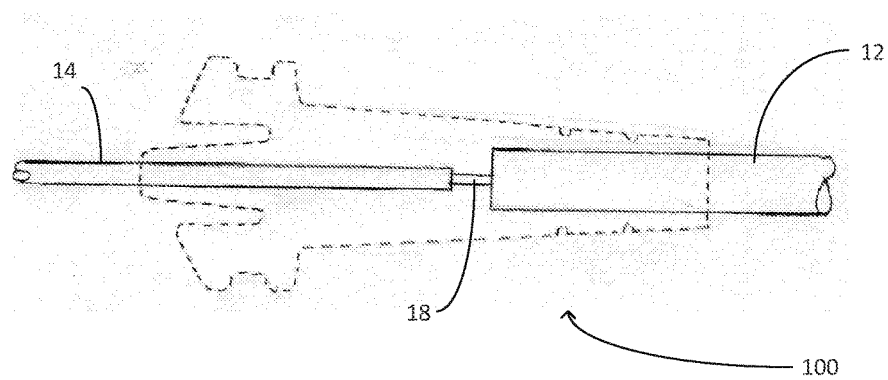
FIG. 4 shows the embodiment of FIG. 3 with the overmold portion in phantom lines to reveal internal details.

Turning now to FIGS. 3 and 4, a transition 100 in accordance with a first embodiment of the present invention is illustrated. As shown, transition 100 includes an overmold 102 configured to surround the terminal ends of cable 12 and furcation 14 and the short length of optical fiber 18 therebetween. Overmold 102, which may formed of polyamide or another suitable polymer, provides sufficient strength and rigidity to lock everything in place while protecting the fragile length of optical fiber. Furcation 14 may be advantageously terminated with a common optical fiber connector.

Figure 5:
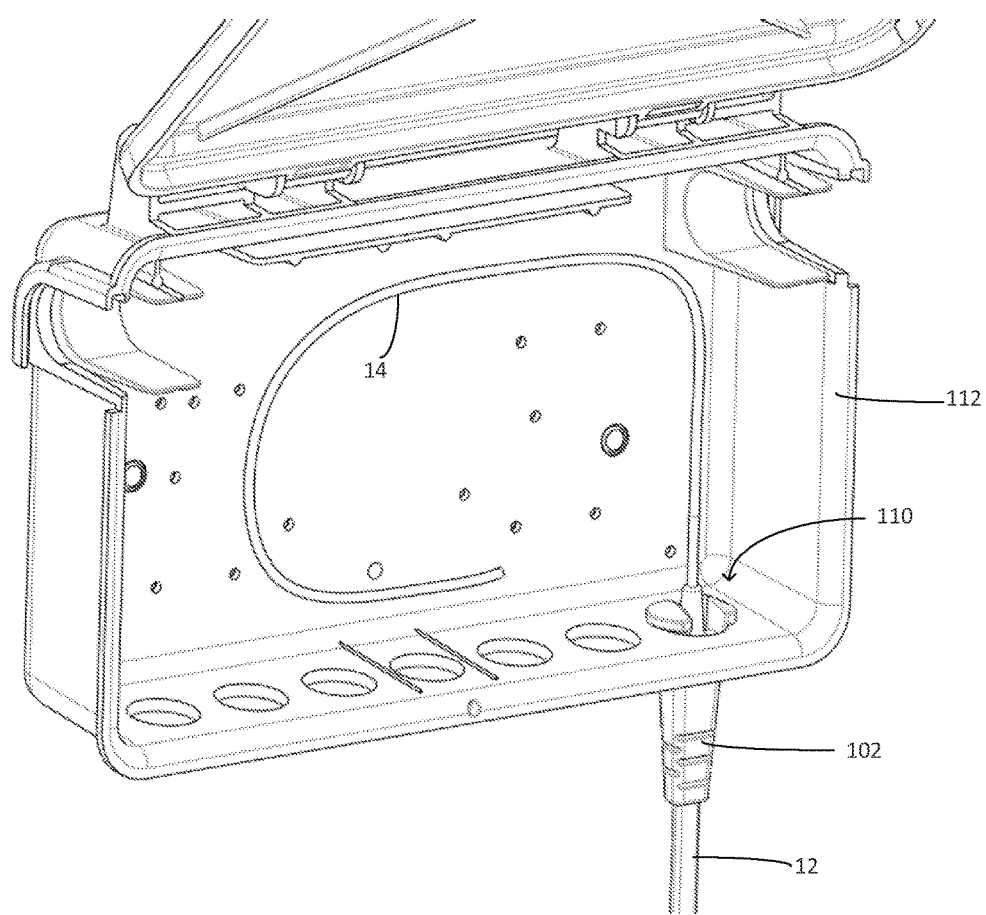
FIG. 5 shows installation of the embodiment of FIG. 3 in the entry port of a network interface device (NID) box.

Overmold 102 has three portions: cable portion 104, furcation portion 106, and retention portion 108. Cable portion 104 may be provided with parallel grooves on its outer surface to yield a degree of flexibility. Referring now also to FIG. 5, retention portion 108 advantageously serves as a grommet for an entry port 110 of a NID 112. Referring again to FIG. 3, retention portion 108 in this embodiment comprises a pair of flexible arms 114a and 114b which compress as the transition is pushed into entry port 110. When the entry port is aligned with a reduced diameter portion of retention portion 108, the arms snap into position to retain the transition 100 in position with respect to the entry port. Because the retention feature is incorporated into the transition, space inside the box that would otherwise be occupied by the transition is freed up. It will be appreciated that, in this manner, connection and disconnection of the cable to the NID entry port can be quickly accomplished.

Figure 6:
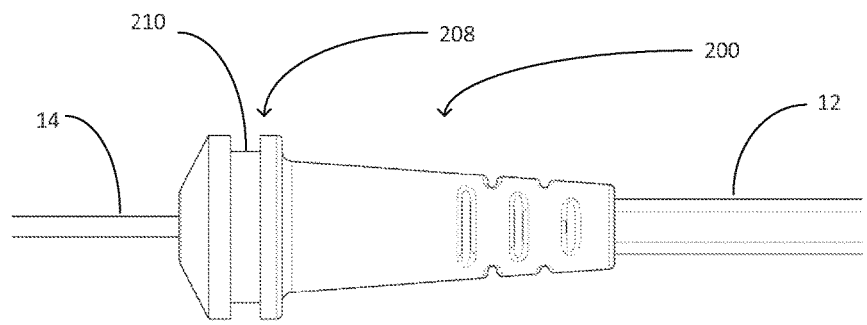
FIG. 6 is an elevational view of a cable to furcation transition in accordance with a second embodiment of the present invention.
Figure 7:
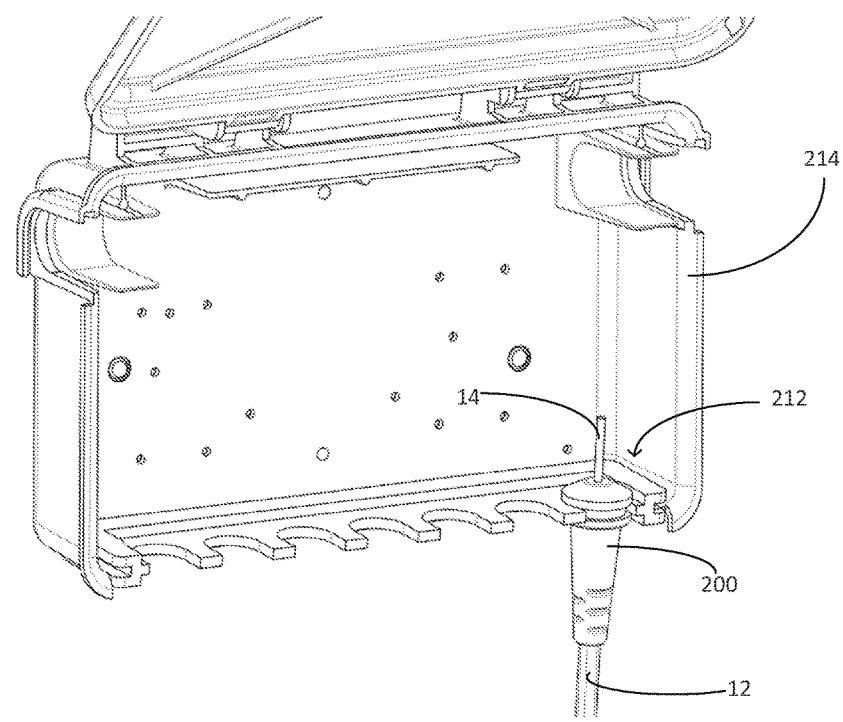
FIG. 7 shows installation of the embodiment of FIG. 6 in the entry port of a NID box.

FIG. 6 illustrates a transition 200 in accordance with another embodiment of the present invention. In this case, transition 200 includes a retention portion 208 defining a circular groove 210 on its outer surface. As shown in FIG. 7, this allows it to be slid into an entry port 212 which is open on one side. The retention feature 208 prevents the cable from being pulled out of the NID 214, thus eliminating the need for additional means to secure the cable.

Figure 8:
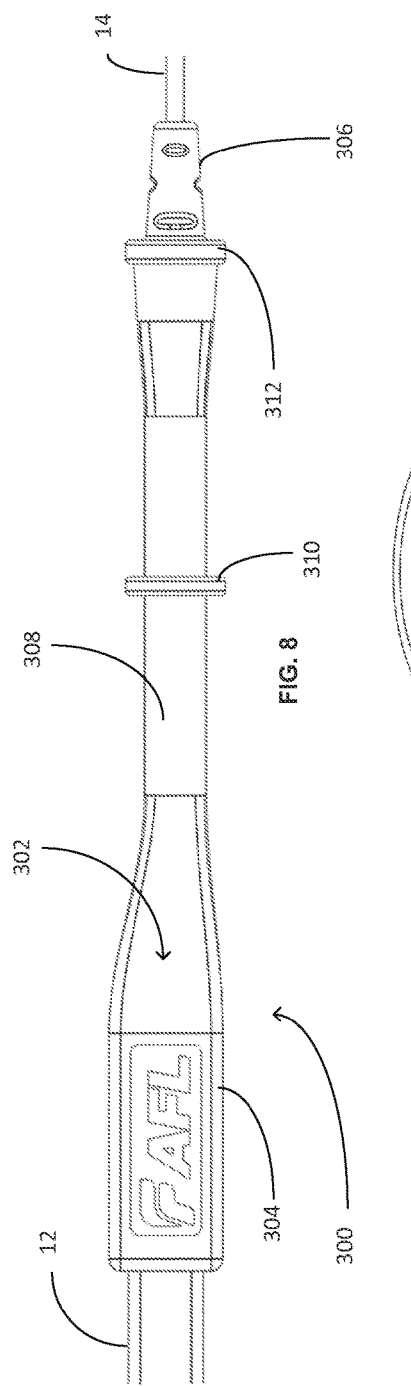
FIG. 8 is an elevational view of a cable to furcation transition in accordance with a third embodiment of the present invention.

Turning now to FIG. 8, a transition 300 in accordance with another embodiment of the present invention is illustrated. In this case, overmold 302 surrounds the terminal ends of cable 12 and furcation 14 and the short length of optical fiber 18 therebetween. As shown, overmold 302 has a cable portion 304, a furcation portion 306, and a retention portion 308. Retention portion 308 is elongate and has exterior dimensions similar to that of the outer jacket of cable 12 which allows it to fit inside of existing entry port grommets. Retention shoulders 310 and 312 may be integrally formed as part of overmold 302 to retain the transition 300 in position.

Figure 11:
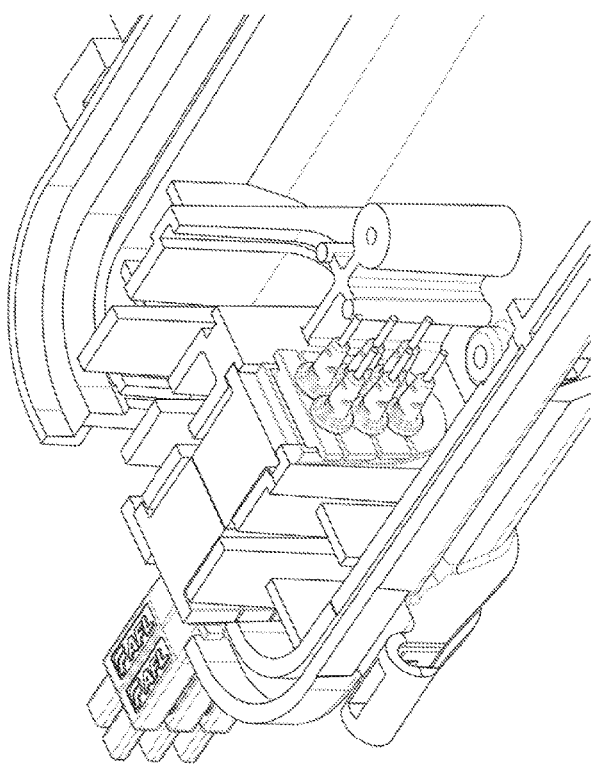
FIG. 11 shows the transitions and grommets of FIG. 10 situated in a closure entry port.

FIGS. 9 and 10 show a plurality of transitions 300 stacked in entry port grommets 314. As can be seen, the retention shoulders prevent the cable from being pulled out of the grommets once installed in the NID (see FIG. 11). Because the transitions are located at the entry port, space that would otherwise be occupied by the transition is freed up inside of the NID. Also, the need for cable clamps inside of the NID to secure the cables is eliminated.

Figure 12B:
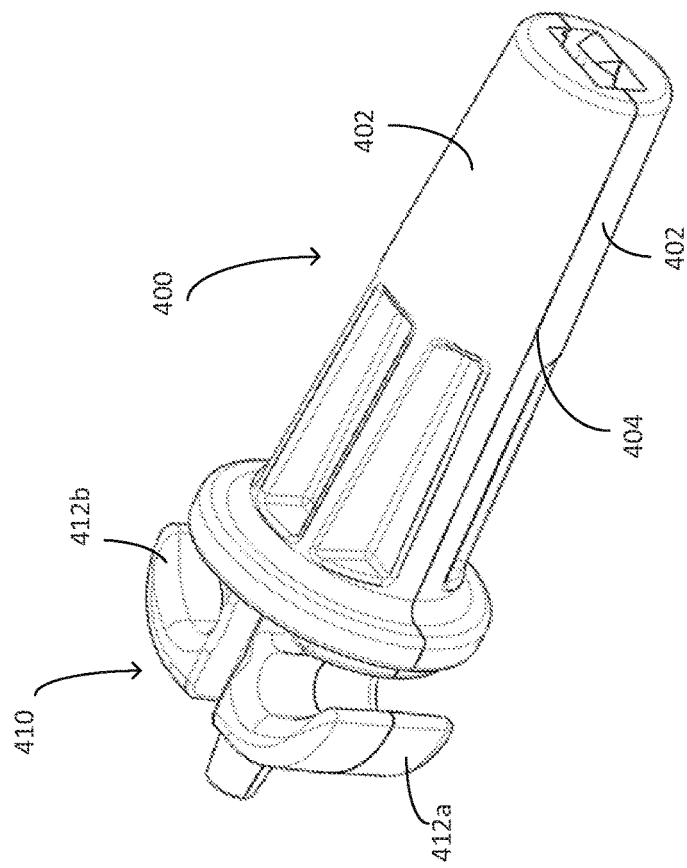
FIG. 12B is a perspective assembled view of transition of FIG. 12A.
Figure 12A:
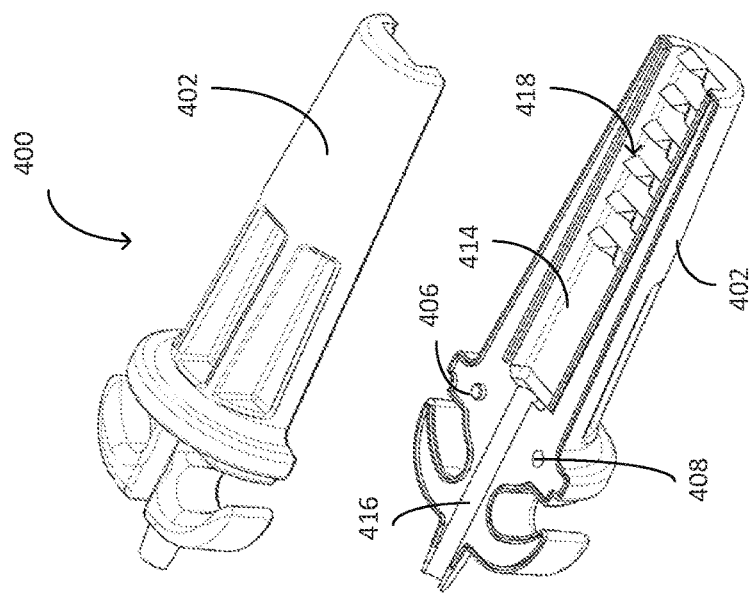
FIG. 12A is a perspective disassembled view of transition in accordance with a fourth embodiment of the present invention.
Figure 14:
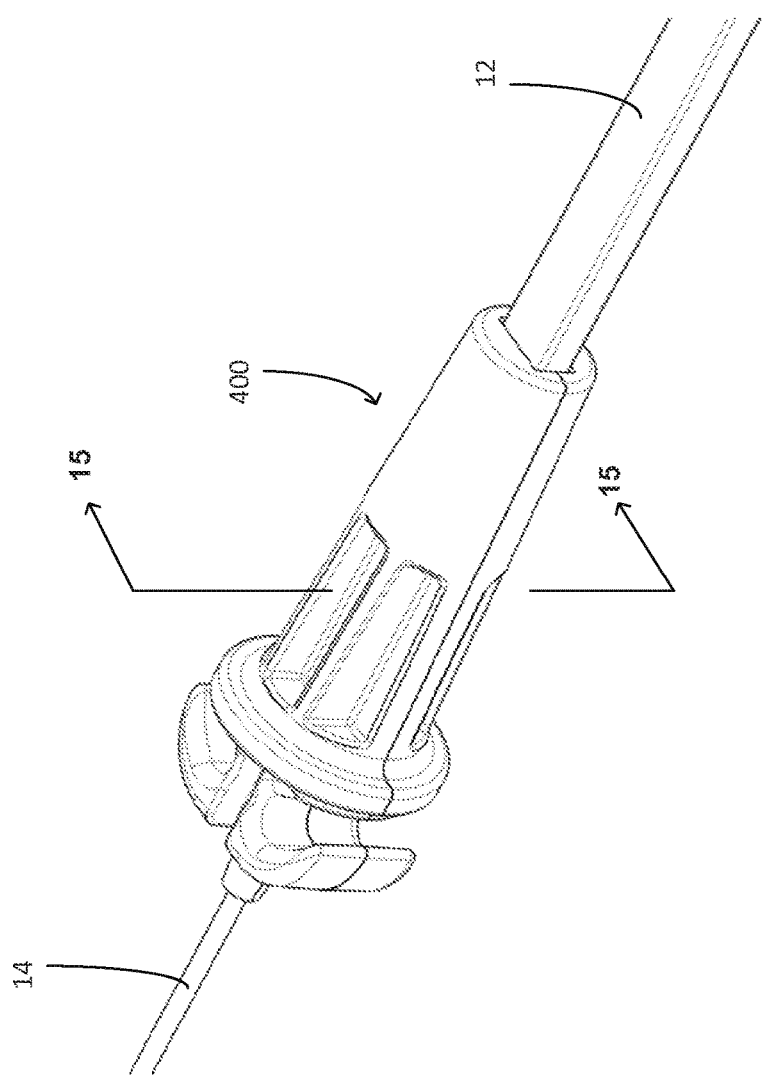
FIG. 14 shows the transition as in FIG. 13 with the cable fully inserted.

FIGS. 12A and 12B illustrate a transition 400 constructed in accordance with a still further embodiment of the present invention. In this case, transition 400 comprises a plurality (e.g., two) housing elements 402 that are mated together to form the overall transition 400. In some exemplary embodiments, elements 402 may be formed of a suitable plastic using injection molding techniques. As a result, elements 402 may be fixed together using any suitable technique, such as ultrasonic welding along the side seams 404 or application of appropriate adhesive. Preferably, elements 402 may have aligning features, such as protrusion 406 and hole 408, to assist in proper registration.

In this embodiment, transition 400 includes a retention portion 410 which serves as a grommet for the entry port of a NID in a manner similar to that described above in previous embodiments. For example, retention portion 410 may include flexible arms 412a and 412b which compress and then snap into position as transition 400 is pushed into the entry port.

Elements 402 are each preferably formed so as to allow insertion and retention of the individual optical fiber after transition 400 is assembled. As can be seen in FIG. 12A, for example, element 402 may define a first wider groove 414 for receipt of the cable and a second narrower groove 416 through which the furcation tube extends. Preferably, a plurality of gripping teeth 418 may be located in each of the larger grooves 414. The gripping teeth may be integrally molded into groove 414 or may be part of a separate insert (such as a metal insert) placed into the grooves 414 before elements 402 are secured together.

Insertion of a cable 12 into transition 400 will now be described with reference to the remaining figures. As shown in FIG. 13, a portion of the outer jacket of cable 12 is removed to expose a length of optical fiber for the furcation. In this case, cable 12 is a typical flat drop cable in which strength members run alongside the optical fiber. A stub length of the strength members 420a and 420b may extend beyond the outer sheath. Preferably, the optical fiber may be located inside of and protected by furcation 14. The cable 12 is thus pushed into an elongated opening formed by the opposed grooves 414. As a result, the cable will be securely retained by the gripping teeth 418. At the same time, furcation 14 will continue out of the other end of transition 400 as desired. It will be appreciated that the design of transition 400 allows it to be installed on cable 12 either in the factory or by a technician in the field.

Various advantages to embodiments of the present invention include, in addition the ones already discussed, the following:

a. Reduced size of cable assembly inside closure (transition located at entry port instead of inside box).
b. Easy installation into box with retention features built into transition, no need to use cable clamps, etc. to prevent cable pullout.
c. Lower material cost.
d. Common connectors and cable may be used rather than custom parts.
e. Overmold embodiments exhibit lower processing time versus the prior art (5 minute epoxy cure versus 30 second mold time).

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. An optical fiber transition assembly comprising:
a cable having a first terminal end from which extends an optical fiber;
a furcation tube having a second terminal end near said first terminal end of said cable into which said optical fiber of said cable is received; and
a polymeric transition element surrounding said first and second terminal ends to protect and secure said optical fiber in transition from said cable to said furcation tube, the polymeric transition element extending along an axis from a first end to a second end, the polymeric transition element including a larger opening defined in the first end, a smaller opening defined in the second end, and a bore extending from the larger opening to the smaller opening, the bore including a wide portion and a narrow portion, the wide portion of the bore extending from the larger opening to the narrow portion of the bore and the narrow portion of the bore extending from the wide portion of the bore to the smaller opening, the first terminal end directly surrounded by the wide portion of the bore and the second terminal end directly surrounded by the narrow portion of the bore, said polymeric transition element being configured to be retained in an entry port of an enclosure.

2. An optical fiber transition assembly as set forth in claim 1, wherein said polymeric transition element comprises a molded element having a cable portion, a furcation portion, and a retention portion.

3. An optical fiber transition assembly as set forth in claim 2, wherein said furcation portion interposes said cable portion and said retention portion.

4. An optical fiber transition assembly as set forth in claim 2, wherein said retention portion interposes said cable portion and said furcation portion.

5. An optical fiber transition assembly as set forth in claim 4, wherein at least part of said retention portion has an outer configuration substantially similar in its dimensions to that of said cable.

6. An optical fiber transition assembly in claim 5, wherein said retention portion comprises first and second spaced apart shoulders for engaging an entry port grommet.

7. An optical fiber assembly as set forth in claim 2, wherein said cable portion of said transition element defines a plurality of transverse grooves on its outer surface to facilitate flexibility.

8. An optical fiber transition assembly as set forth in claim 1, wherein said transition element comprises multiple sections attached together.

9. An optical fiber transition assembly as set forth in claim 8, wherein the larger opening of the transition element comprises an elongated opening in which the cable is slidably received.

10. An optical fiber transition assembly as set forth in claim 9, comprising gripping teeth formed in said elongated opening that facilitate retention of said cable.

11. An optical fiber transition assembly as set forth in claim 1, wherein said transition element comprises at least two flexible arms for snapping into said entry port.

12. An optical fiber transition assembly as set forth in claim 1, wherein said transition element comprises a circular groove for sliding into said entry port.

13. An optical fiber assembly comprising:
an optical fiber cable having a terminal end from which extends an optical fiber;

an enclosure defining an entry port through which said optical fiber passes into an interior thereof; and a transition element surrounding said terminal end of said optical fiber cable to protect and secure said optical fiber in transition from said cable to said interior of said enclosure, the transition element extending along an axis from a first end to a second end, the transition element including a larger opening defined in the first end, a smaller opening defined in the second end, and a bore extending from the larger opening to the smaller opening, the bore including a wide portion and a narrow portion, the wide portion of the bore extending from the larger opening to the narrow portion of the bore and the narrow portion of the bore extending from the wide portion of the bore to the smaller opening the terminal end directly surrounded by the wide portion of the bore, said transition element configured to be retained at said entry port such that the transition element is maintained in position.

14. An optical fiber assembly as set forth in claim 13, wherein said transition element comprises a molded element having a cable portion, a furcation portion, and a retention portion.

15. An optical fiber assembly as set forth in claim 14, wherein at least part of said retention portion has an outer configuration substantially similar in its dimensions to that of said cable.

16. An optical fiber assembly as set forth in claim 13, wherein said transition element comprises at least two flexible arms for snapping into said entry port.

17. An optical fiber assembly as set forth in claim 13, wherein said transition element comprises a circular groove for sliding into said entry port.

18. An optical fiber assembly as set forth in claim 13, wherein said transition element comprises multiple sections attached together.

19. An optical fiber assembly as set forth in claim 18, wherein the larger opening of the transition element comprises an elongated opening in which the cable is slidably received.

20. An optical fiber assembly as set forth in claim 19, comprising gripping teeth formed in said elongated opening that facilitate retention of said cable.

21. A transition element for transition of an optical fiber from an optical fiber cable to a furcation tube, said transition element comprising:

a first housing element extending along an axis from a first end to a second end, the first housing element including a larger opening defined in the first end, a smaller opening defined in the second end, a wide groove, and a narrow groove, the wide groove of the first housing element extending along the axis of the first housing element from the larger opening of the first housing element to the narrow groove of the first housing element, the narrow groove of the first housing element extending along the axis of the first housing element from the wide groove of the first housing element to the smaller opening of the first housing element; and a second housing element extending along an axis from a first end to a second end, the second housing element including a larger opening defined in the first end, a smaller opening defined in the second end, a wide groove, and a narrow groove, the wide groove of the second housing element extending along the axis of the second housing element from the larger opening of the second housing element to the narrow groove of the second housing element, the narrow groove of the second housing element extending along the axis of the second housing element from the wide groove of the second housing element to the smaller opening of the second housing element;

wherein the first housing element and the second housing element are configured to be attached together, the larger opening of the first housing element and the larger opening of the second housing element collectively defining a larger opening of the transition element when the first housing element and the second housing element are attached together, the smaller opening of the first housing element and the smaller opening of the second housing element collectively defining a smaller opening of the transition element when the first housing element and the second housing element are attached together, the wide groove of the first housing element and the wide groove of the second housing element collectively defining a wide portion of a bore of the transition element when the first housing element and the second housing element are attached together, the narrow groove of the first housing element and the narrow groove of the second housing element collectively defining a narrow portion of the bore of the transition element when the first housing element and the second housing element are attached together, the wide portion of the bore extending from the larger opening of the transition element to the narrow portion of the bore and the narrow portion of the bore extending from the wide portion of the bore to the smaller opening of the transition element, the wide portion of the bore configured to directly receive the optical fiber cable when the first housing element and the second housing element are attached together, and the narrow portion of the bore configured to directly receive the furcation tube when the first housing element and the second housing element are attached together.

22. The transition element of claim 21, wherein the first housing element and the second housing element each have integrated aligning features to facilitate registration when they are joined together.

23. The transition element of claim 21, further comprising gripping teeth positioned in one of the wide groove of the first housing element and the wide groove of the second housing element to facilitate retention of the optical fiber cable.

24. The transition element of claim 21, wherein the first housing element and the second housing element collectively define a retention portion configured to be retained in an entry port of an enclosure when the first housing element and the second housing element are attached together.

25. The transition element of claim 24, wherein the retention portion comprises at least two flexible arms configured to resiliently engage the entry port.

* * * * *